(12) United States Patent
Fuchs et al.

(10) Patent No.: US 8,394,907 B2
(45) Date of Patent: Mar. 12, 2013

(54) POLYPROPYLENE FOR INJECTION MOLDING

(75) Inventors: Alexander Fuchs, Ferrara (IT); Bernd Schuetz, Lampertheim (DE)

(73) Assignee: Basell Polyolefine GmbH, Wessling (DE)

( * ) Notice: Subject to any disclaimer, the term of this patent is extended or adjusted under 35 U.S.C. 154(b) by 225 days.

(21) Appl. No.: 12/083,793

(22) PCT Filed: Oct. 12, 2006

(86) PCT No.: PCT/EP2006/067312
§ 371 (c)(1),
(2), (4) Date: Apr. 18, 2008

(87) PCT Pub. No.: WO2007/045590
PCT Pub. Date: Apr. 26, 2007

(65) Prior Publication Data
US 2009/0137739 A1 May 28, 2009

Related U.S. Application Data

(60) Provisional application No. 60/729,477, filed on Oct. 21, 2005.

(51) Int. Cl.
*C08F 110/06* (2006.01)
*C08F 4/00* (2006.01)
*C08K 5/10* (2006.01)
*C08L 23/12* (2006.01)

(52) U.S. Cl. ........... 526/351; 526/90; 524/582; 524/317

(58) Field of Classification Search ............ 525/55, 525/240, 242, 322, 323, 324, 331.7; 526/351, 526/902, 904, 943
See application file for complete search history.

(56) References Cited

U.S. PATENT DOCUMENTS

| | | | | |
|---|---|---|---|---|
| 3,207,739 A * | 9/1965 | Wales | ............ | 524/396 |
| 4,065,609 A * | 12/1977 | Willmore | ............ | 526/61 |
| 5,597,881 A | 1/1997 | Winter et al. | | |
| 5,698,487 A | 12/1997 | Sacchetti et al. | | |
| 6,399,533 B2 | 6/2002 | Sacchetti et al. | | |
| 6,410,662 B1 | 6/2002 | Ushioda et al. | | |
| 6,528,565 B1 * | 3/2003 | Russell | ............ | 524/247 |
| 6,559,252 B1 | 5/2003 | Horton et al. | | |
| 6,608,224 B2 | 8/2003 | Resconie et al. | | |
| 6,841,501 B2 | 1/2005 | Resconi et al. | | |
| 6,878,786 B2 | 4/2005 | Resconi et al. | | |
| 6,953,829 B2 | 10/2005 | Kratzer et al. | | |
| 7,074,871 B2 * | 7/2006 | Cecchin et al. | ............ | 526/351 |
| 7,101,940 B2 | 9/2006 | Schottek et al. | | |
| 7,141,527 B1 | 11/2006 | Van Baar et al. | | |
| 7,314,903 B2 | 1/2008 | Resconi et al. | | |
| 2003/0149199 A1 * | 8/2003 | Schottek et al. | ............ | 526/126 |
| 2004/0122196 A1 | 6/2004 | Pierini et al. | | |
| 2004/0132612 A1 | 7/2004 | Resconi et al. | | |
| 2006/0167128 A1 | 7/2006 | Olivier et al. | | |

FOREIGN PATENT DOCUMENTS

| | | |
|---|---|---|
| DE | 19962814 | 6/2001 |
| DE | 19962910 | 7/2001 |
| EP | 593888 | 4/1994 |
| EP | 633272 | 1/1995 |
| JP | 2002-275331 | 9/2002 |
| KR | 2002-0046077 | 6/2002 |
| WO | 91/02012 | 2/1991 |
| WO | 92/00333 | 1/1992 |
| WO | 95/32995 | 12/1995 |
| WO | 99/21899 | 5/1999 |
| WO | 01/21674 | 3/2001 |
| WO | 01/62764 | 8/2001 |
| WO | 02/102811 | 12/2002 |
| WO | 2004/005360 | 1/2004 |
| WO | 2007/045600 | 4/2007 |
| WO | 2007/045603 | 4/2007 |

OTHER PUBLICATIONS

Pasquini, Nello. Polypropylene Handbook. $2^{nd}$ Edition. 2005. p. 308.*
L. Resconi et al., "Selectivity in Propene Polymerization with Metallocene Catalysts," *Chem. Review*, vol. 100(4), p. 1253-1345 (2000).
R. Gächter & H. Müller, "Stabilizers, Processing Aids, Plasticizers, Fillers, Reinforcements, Colorants for Thermoplastics," *Plastics Additives Handbook—$4^{th}$* Edition, Carl Hanser Verlag, Munich, Vienna, New York, Barcelona (1993) (Cover & Copyright pages).
Hans-Robert Brintzinger et al., "Neue Olefin-Polymere mittels neuer Metallocen-Ziegler-Katalysatoren," Bundesministerium fuer Bildung, Wissenschaft, Forschung and Technologie, Forschungsbericht (03M40719), Mar. 1997.

* cited by examiner

*Primary Examiner* — David W Wu
*Assistant Examiner* — Elizabeth Eng

(57) ABSTRACT

A polypropylene resin comprising a propylene polymer having the following features:
  a) melt flow rate (MFR) (ISO 1133) (230° C./2.16 kg) comprised between 120 g/10' and 400 g/10';
  b) distribution of molecular weight Mw/Mn lower than 4;
  c) haze measured according to ASTM D 1003 comprised between 5% and 30%; and
  d) flexural modulus measured according ISO 178 after 48 h comprised between 1750 N/m$^2$ and 2300 N/m$^2$.

14 Claims, No Drawings

POLYPROPYLENE FOR INJECTION MOLDING

This application is the U.S. national phase of International Application PCT/EP2006/067312, filed Oct. 12, 2006, claiming the benefit under 35 U.S.C. 119(e) of U.S. Provisional Application No. 60/729,477, filed Oct. 21, 2005; the disclosures of International Application PCT/EP2006/067312 and U.S. Provisional Application No. 60/729,477, each as filed, are incorporated herein by reference.

The present invention relates to a polypropylene polymer endowed with some features especially suitable for injection molding application especially for the replacement of polystyrene resins. Polypropylene has been used for several years for casting cups and molds. For example in WO 02/44260 a polypropylene having a melt flow rate lower than 100 g/10 min is described for injection molding in particular for the obtainment of contact lenses and other precision application. EP 593 888 describes propene homopolymers with melt flow rates lower than 110 g/10 min for injection moulding applications with improved stiffness. Products obtained via peroxidic degradation with a MFR of about 120 g/10' are described in "Neue Olefin-Polymere mittels neuer Metallocen-Ziegler-Katalysatoren", Bundesministerium fuer Bildung, Wissenschaft, Forschung and Technologie, Forschungsbericht (03M40719), Maerz 1997.

However there is still a need for a polypropylene resin having a balancement of improved properties. In particular when the polypropylene resin is endowed with a high stiffness, high brittleness, narrow molecular weight distribution, high transparency and good flowability it is fit for the replacement of polystyrene in injection molding application such as the production of cups or other similar objects like plastic cutlery. In particular brittleness is important for this kind of application, where the cups at the end have to be destroyed and the broken fragments of these cups are less dangerous for getting hurt by the sharp fragments.

Therefore an object of the present invention is a polypropylene resin comprising a propylene polymer said polypropylene resins is endowed with the following features:
  a) melt flow rate (MFR) (ISO 1133) (230° C./2.16 kg) comprised between 120 g/10' and 400 g/10'; preferably comprised between 120 g/10' and 200 g/10'; preferably comprised between 130 and 200 g/10' and more preferably between 140 g/10' and 180/g 10'.
  b) distribution of molecular weight Mw/Mn lower than 4; preferably lower than 3; more preferably lower than 2.6;
  c) haze measured according to ASTM D 1003 (1 mm placque) comprised between 5% and 30%; preferably between 7% and 20%; more preferably between 9% and 17%;
  d) flexural modulus measured according ISO 178 after 48 h comprised between 1750 N/mm$^2$ and 2300 N/mm$^2$ preferably comprised between 1800 N/mm$^2$ and 2200 N/mm$^2$ and most preferably between 1850 N/mm$^2$ and 2100 N/mm$^2$.

Preferably the polypropylene resin object of the present invention is further endowed with:
e) notched IZOD according Iso (180 1A) at 23° C. after 48 h comprised between 3 kJ/m$^2$ and 1.5 kJ/m$^2$ preferably between 3 kJ/m$^2$ and 2 kJ/m$^2$.

Preferably the polypropylene resin is further endowed with the following features:
f) hexane extractables of less than 2.6% by weight, preferably less than 1% by weight.
g) xylene solubles at 25° C. of less than 2% by weight, more preferably less than 1% by weight.

Preferably the propylene polymer of the polypropylene resin object of the present invention has isotactic pentads (mmmm) measured by $^{13}$C-NMR higher than 90%; preferably higher than 92%; more preferably higher than 95% and most preferred higher than 96%.

The propylene polymer of the present invention has preferably a content of 2,1-insertions lower than 0.5%, more preferred lower than 0.3% measured by $^{13}$C NMR spectroscopy according to the below described method. The content of 1,3 insertions is preferably below 0.2%, more preferrably lower than 0.1% as measured according to the below described method.

The propylene polymer of the polypropylene resin object of the present invention can be a propylene homopolymer or a propylene copolymer containing up to 20% by mol of ethylene or alpha olefins of formula CH$_2$=CHA derived units, wherein A is a C$_2$-C$_{20}$ alkyl radical. Preferably the comonomers used in the propylene copolymers are ethylene or 1-butene. The amount of comonomer in the propylene copolymer ranges preferably from 0.1% to 10% by mol, more preferably from 0.1% by mol to 5% by mol.

The propylene polymer of the propylene resin object of the present invention can be only one polymer or it can be a blend of two or more propylene polymer, wherein the blend itself meet the described features.

The polypropylene resin of the present invention preferably further comprises customary amounts of customary additives known to those skilled in the art, e.g. stabilizers, lubricants and mold release agents, fillers, nucleating agents, antistatics, plasticizers, dyes, pigments, anti-fungal, anti-microbial agents, film cavitating agents or flame retardants. In general, these are incorporated during granulation of the pulverulent product obtained in the polymerization.

Customary stabilizers include antioxidants such as sterically hindered phenols, sterically hindered amines or UV stabilizers, processing stabilizers such as phosphites or phosphonites, acid scavengers such as calcium stearate or zinc stearate or dihydrotalcite, as well as calcium, zinc and sodium caprylate salts. In general, the propylene copolymer compositions of the present invention contain one or more stabilizers in amounts of up to 2% by weight.

Suitable lubricants and mold release agents are, for example, fatty acids, calcium, sodium or zinc salts of fatty acids, fatty acid amides or low molecular weight polyolefin waxes, which are usually used in concentrations of up to 2% by weight.

Possible fillers are, for example, talc, calcium carbonate, chalk or glass fibers, and these are usually used in amounts of up to 50% by weight.

Examples of suitable nucleating agents are inorganic additives such as talc, silica or kaolin, salts of monocarboxylic or polycarboxylic acids, e.g. sodium benzoate or aluminum tert-butylbenzoate, dibenzylidenesorbitol or its C$_1$-C$_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis(4,6,-di-tert-butylphenyl)phosphate. The nucleating agent content of the propylene copolymer composition is generally up to 5% by weight.

Such additives are generally commercially available and are described, for example, in Gächter/Müller, Plastics Additives Handbook, 4th Edition, Hansa Publishers, Munich, 1993.

In a preferred embodiment, the propylene polymer compositions of the present invention contain from 0.03 to 1% by weight, preferably from 0.05 to 0.25% by weight, of a nucleating agent, in particular dibenzylidenesorbitol or a dibenzylidenesorbitol derivative, particularly preferably dimethyldibenzylidenesorbitol.

Furthermore the addition of glyceryl monostearate (tradenames for these products are Loxiol EP 55, Atmer 122, Baerolub MS 90 or Atmer 129) is preferred in the present invention. The range contains from 0.05% by weight to 0.6% by weight, more preferred from 0.1% to 0.4% by weight. The polypropylene resin object of the present invention is particularly suitable to be used for injection molding, in particular for the replacement of polystyrene resins. For example the polypropylene resin of the present invention can be advantageously used for obtaining cups. With respect to the polystyrene resin commonly used cups obtained by the polypropylene resin of the present invention has a further advantage to be more brittle with the advantage to make easier to destroy the used cup which fragment results to be less dangerous.

Thus a further object of the present invention is the use of the polypropylene resin described above for the production of molded articles.

A further object of the present invention are molded article obtained by using the polypropylene resin object of the present invention.

The propylene polymer of the polypropylene resin object of the present invention can be obtained by using a metallocene-based catalyst system.

In particular said propylene polymer is obtainable by using a catalyst system obtainable by contacting:
a) a metallocene compound of formula (I)

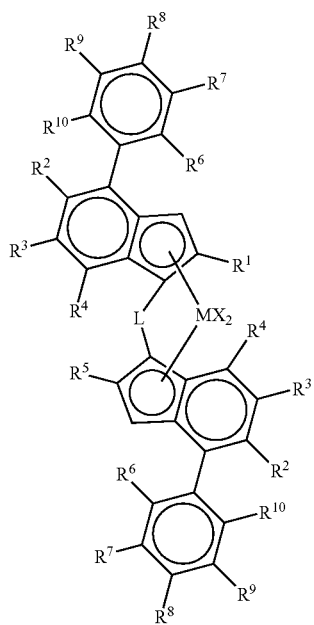

(I)

wherein
M is a transition metal belonging to group 3, 4, 5, 6 or to the lanthanide or actinide groups in the Periodic Table of the Elements; preferably M is titanium, zirconium or hafnium;

X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silyliene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$; even more preferably $(Z(R'')_2)_n$ is $Si(CH_3)_2$.

$R^1$ and $R^5$ are a $C_1$-$C_{40}$ hydrocarbon radical optionally containing heteroatoms belonging to groups 13-17 of the Periodic Table of the Elements; preferably $R^1$ and $R^5$ are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ is a linear radical and $R^5$ is a branched $C_1$-$C_{10}$-alkyl radical; preferably $R^5$ is a $C_1$-$C_{10}$-alkyl radical branched in alpha position i.e. the carbon atom in the alpha position is a secondary or a tertiary carbon atom, such as an isopropyl radical;

$R^2$, $R^3$ and $R^4$, equal to or different from each other, are hydrogen atoms or $C_1$-$C_{40}$ hydrocarbon radicals optionally containing heteroatoms belonging to groups 13-17 of the Periodic Table of the Elements; preferably $R^2$, $R^3$ and $R^4$, equal to or different from each other are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; more preferably $R^2$, $R^3$ and $R^4$ are hydrogen atoms or $C_1$-$C_{20}$-alkyl radicals;

$R^6$, $R^7$, $R^8$, $R^9$, and $R^{10}$ equal to or different from each other, are hydrogen atoms or $C_1$-$C_{40}$ hydrocarbon radicals optionally containing heteroatoms belonging to groups 13-17 of the Periodic Table of the Elements; preferably $R^2$, $R^3$ and $R^4$, equal to or different from each other are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_1$-$C_{40}$-alkylaryl or $C_7$-$C_{40}$-arylalkyl radical; optionally containing heteroatoms belonging to groups 13-17 of the Periodic Table of the Elements; more preferably $R^2$, $R^3$ and $R^4$ are hydrogen atoms or $C_1$-$C_{40}$-alkyl radicals; with the proviso that at least one among $R^6$, $R^7$, $R^8$, $R^9$, and $R^{10}$ is different from an hydrogen atom; preferably $R^6$, $R^7$, $R^9$, and $R^{10}$ $R^8$ are hydrogen atoms;

preferably $R^8$ is a $C_1$-$C_{10}$-alkyl radicals, more preferably $R^8$ is a $C_1$-$C_{40}$-alkyl radical wherein the atom in the alpha position is a secondary carbon or a tertiary carbon, such as isopropyl or tertbutyl radicals;

b) at least an alumoxane or a compound able to form an alkylmetallocene cation; and
c) optionally an organo aluminum compound.

Alumoxanes used as component b) in the catalyst system according to the present invention can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{10}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

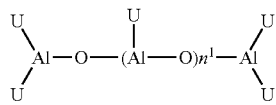

can be used in the case of linear compounds, wherein $n^1$ is 0 or an integer of from 1 to 40 and the substituents U are defined as above; or alumoxanes of the formula:

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns. Non-limiting examples of aluminium compounds that can be reacted with water to give suitable alumoxanes (b), described in WO 99/21899 and WO01/21674, are: tris(2,3,3-trimethyl-butyl) aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl) aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl) aluminium, tris(2-ethyl-3,3-dimethyl-butyl)aluminium, tris (2-ethyl-3,3-dimethyl-pentyl)aluminium, tris(2-isopropyl-3,3-dimethyl-butyl)aluminium, tris(2-trimethylsilyl-propyl) aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl) aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Among the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate, Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Additional examples of compounds of formula $D^+E^-$ that can be used according to the present invention are described in WO 04/005360, WO 02/102811 and WO 01/62764.

Organic aluminum compounds used as compound c) are those of formula $H_jAlU_{3-j}$ or $H_jAl_2U_{6-j}$ as described above.

The catalysts described above can also be supported on an inert carrier. This is achieved by depositing the metallocene compound a) or the product of the reaction thereof with the component b), or the component b) and then the metallocene compound a) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633 272.

Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The solid compound thus obtained, in combination with the further addition of the alkylaluminium compound either as such or prereacted with water if necessary, can be usefully employed in the gas-phase polymerization.

The following examples are given for illustrative purpose and do not intend to limit the invention.

EXAMPLES

Analysis

All data was obtained according to the following methods:

Molecular Weights and MWD

Molecular weights and molecular weight distribution were measured at 145° C. using a Alliance GPCV 2000 instrument (Waters) equipped with three mixed-bed columns TosoHaas TSK GMHXL-HT having a particle size of 13 μm. The dimensions of the columns were 300×7.8 mm. The mobile phase used was vacuum distilled 1,2,4-Trichlorobenzene (TCB) and the flow rate was kept at 1.0 ml/min. The sample solution was prepared by heating the sample under stirring at 145° C. in TCB for two hours. The concentration was 1 mg/ml. To prevent degradation, 0.1 g/l of 2,6-diterbutyl-p-cresol were added. 326.5 μL of solution were injected into the column set. A calibration curve was obtained using 10 polystyrene standard samples (EasiCal kit by Polymer Laboratories) with molecular weights in the range from 580 to 7500000; additionally two other standards with peak molecular weight of 11600000 and 13200000 from the same manufacturer were included. It was assumed that the K values of the Mark-Houwink relationship were:

$K=1.21\times10^{-4}$ dL/g and $\alpha=0.706$ for the polystyrene standards $K=1.90\times10^{-4}$ dL/g and $\alpha=0.725$ for the polypropylene samples A third order polynomial fit was used for interpolate the experimental data and obtain the calibration curve. Data acquisition and processing was done by using Empower 1.0 with GPCV option by Waters.

Intrinsic Viscosity:

Intrinsic viscosity was measured in tetrahydronaphtalene (THN) solution obtained by dissolving the polymer at 135° C. for 1 hour.

Hexane Extractables

From a 100 micron thick film, strips approximately 1 cm wide and 3-5 cm long are prepared totalling 2.5 gr. These strips are placed in a glass autoclave containing 1 liter of n-hexane at 50° C. under slight agitation for 2 hours. The hot hexane was filtered and evaporated to a volume of 70-80 ml. The residue is then placed in an oven at 50° C. (under a slight flow of dry nitrogen) until th solvent has been evaporated. Thereafter the temperature in the oven is raised to 105° C. until the residue has reached a stable weight. After cooling the residue is weighted (PC). At the same time a blank test is performed in parallel (PB).

The percentage of substance which can be extracted is calculated according to the following formula Extractable substance(% wt)=((PC−PB)*100)/P Wherein
PC=weight of the evaporation residue (rg)
PB=weight of the blank test residue (gr)
P=weight of the polymer sample.

Xylene-Soluble Fraction 2.5 g of polymer and 250 mL of o-xylene are introduced in a glass flask equipped with a refrigerator and a magnetical stirrer. The temperature is raised in 30 minutes up to the boiling point of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and 100 ml of the filtered liquid is poured in a previously weighed aluminum container, which is heated on a heating plate under nitrogen flow, to remove the solvent by evaporation. The container is then kept on an oven at 80° C. under vacuum until constant weight is obtained. The residue is weighted to determine the percentage of xylene-soluble polymer.

Melt Flow Rate (MFR)

Determined according to ISO 1133 (230° C., 2.16 Kg). The ISO norm describes the procedure of measuring the MFR values til 150 g/10'. To measure the MFR value of products with higher MFR (up to ca. 400 g/10') the unmodified procedure was applied.

Flexural Modulus

Determined according to ISO 178

IZOD Impact Strength

Determined according to ISO 180/1A

Tensile Modulus, Stress and Elongation at Yield and at Break

Determined according to ISO 527

Melting Temperature, Melting Enthalpy (ΔHm), Crystallization Temperature and Crystallization Enthalpy (ΔHc)

determined by DSC according ISO 3146 with a heating rate of 20K per minute

Haze
Determined according ASTM D 1003 on 1 mm placque
Gloss
Determined according ASTM 2457 at 45° and 60°.
$^{13}$C-NMR
NMR analysis. $^{13}$C-NMR spectra of PP were acquired on a DPX-400 spectrometer operating at 100.61 MHz in the Fourier transform mode at 120° C. The peak of the mmmm pentad carbon were used as internal reference at 21.8 ppm and 29.9 ppm respectively. The samples were dissolved in 1,1,2,2-tetrachloroethane-d$_2$ at 120° C. with a 8% wt/v concentration in a 5 mm tube. Each spectrum was acquired with a 90° pulse, 12 seconds of delay between pulses and CPD (WALTZ 16) to remove 1H-13C coupling. About 2500 transients were stored in 32K data points using a spectral window of 6000 Hz.

The assignments of PP spectra were made according to "Selectivity in Propylene Polymerization with Metallocene Catalysts", L. Resconi, L. Cavallo, A. Fait, F. Piemontesi, Chem. Rev., 100, 1253, (2000)).

The mmmm content was obtained modelling the experimental pentad distribution with the enantiomorphic site model. The mmmm content of PP with high content of 2,1 (E) and 1,3 (H) errors was obtained as:

[mmmm]=100(Σ[CH$_3$]−5[mrrm]−5[E]−5[H])/(Σ[CH$_3$])

where Σ[CH$_3$] is the sum of all CH3 groups
The content of 2,1 and 3,1 errors was obtained as:

[E]=100(E$_9$/Σ[CH$_2$])

[H]=100(0.5H$_2$/E[CH$_2$])

where E$_9$ is the peak at 42.14 ppm, H$_2$ is the peak at 30.82 ppm and E[CH$_2$] is the sum of all CH$_2$ groups.
Ethylene Content IR
Calibration is obtained by analyzing propylene/ethylene standard copolymers.
Sample Preparation
By means of a hydraulic press, a sample film was molded between two aluminium foils at about 170° C. and a pressure of 10 kg/cm$^2$ for about a minute. The pressure is then released and the sample was cooled at room temperature. The film thickness is determined according to the following table

| Ethylene forecast (% wt) | Thickens mm |
|---|---|
| <2 | 0.5-1 |
| 2-5 | 0.3-0.5 |
| 5-10 | 0.1-0.3 |
| 10-25 | 0.1 |

The IR spectra is then recorded by using a FTIR apparatus. The ethylene content is then calculated according to the following formula % ethylene(Wt)=A/(At·G)

wherein
G is the slope of the calibration straight line
A is the area of the band due to the methylenic sequences vs. a baseline plotted between the ends of the 790-660 cm$^{-1}$ range, after subtraction of the isotactic polypropylene reference spectrum from the sample spectrum in the same spectral range.
At is the area of the combination band of the sample spectrum between 4482 and 3950 cm$^{-1}$ vs. a baseline plotted between the ends of the range.
Preparation of Polypropylene Resins
The catalyst system is prepared as described in PCT/EP2004/007061 by using rac-dimethylsilylene(2-methyl-4 (4'tertbutyl-phenyl)-indenyl)(2-isopropyl-4(4'tertbutyl-phenyl)-indenyl)zirconium dichloride prepared as described in US 2003/0149199 instead of rac-dimethylsilylbis(2-methyl-4,5-benzo-indenyl)-zirconium dichloride.
Propylene Polymerization
The catalyst system in the form of catalyst mud obtained as described in PCT/EP2004/007061 is fed in the precontact vessel in which it is diluted with about 5 (Kg/h) of propane. From the pre-contact vessel the catalyst system is fed to the prepolymerization loop in which propylene is fed at the same time according to the data reported in table 1. The residence time of the catalyst in the prepolymerization loop is 8 minutes. The prepolymerized catalyst obtained in the prepolymerization loop is then continuously fed into the first loop reactor. The polymer is discharged from the first loop reactor, separated from the unreacted monomer and dried. The reaction conditions are reported in table 1. The MFR of the product is controlled by the feed of hydrogen. Polymerization data are presented in table 1.

TABLE 1

| | | First reactor | | |
|---|---|---|---|---|
| Ex | Prepolymerization Temperature (° C.) | C$_3$ (Kg/h) | H$_2$ (ppm (mol)) | temperature (° C.) |
| 1 | 45 | 350 | 320 | 70 |
| 2 | 45 | 350 | 215 | 70 |
| 3 | 45 | 350 | 470 | 70 |

The following MFR values were measured on the powder according to the procedure described above.

Example 1: 149 g/10'

Example 2: 51 g/10'

Example 3: 390 g/10'

The isotactic pendads (mmmm) of all samples were higher than 95% (measured 96.4%). The 2.1 insertions are <0.3% and the 1.3 insertions <0.1% ($^{13}$C-NMR).
Preparation of the Polypropylene Resins According the Invention For the measurement of the optical and mechanical data, the polymer powder from Examples 1, 2 and 3 was additivated and melt mixed with a Berstdorff ZE25 respective Werner & Pfleiderer ZSK53 twin screw extruder according to table 2 and pellettized. The resins obtained are marked respectively as examples 4, 5 and 6.

TABLE 2

| Sample | Unit | Example 4 | Example 5 | Example 6 |
|---|---|---|---|---|
| Irganox B215 | ppm | 1500 | 1500 | 1500 |
| Calcium Stearate | ppm | 500 | 500 | 500 |
| Millad 3988 | ppm | 2000 | 2000 | 2000 |
| Atmer 129 | ppm | — | 1500 | 1500 |
| Polymer powder MFR 140 (Example 1) | % | 99.6 | 99.45 | — |
| Polymer powder MFR 51 (Example 2) | % | | | 49.45 |
| Polymer Powder MFR 390 (Example 3) | % | | | 50 |

The pelletized material was injection moulded (ISO 1873/2). The production of the test specimens required for use related tests and the tests themselves were carried out in accordance with the standards indicated in table 3.

The results are presented in table 3.

TABLE 3

| Method | Variable Name | Units | Example 4 | Example 5 | Example 6 |
|---|---|---|---|---|---|
| ASTM D1003 | HAZE (1 MM) | % | 13.3 | 12.4 | 15.8 |
| ASTM 2457/ D523 | GLOSS (placque 1 mm) (60') | % | 124.4 | n.m. | n.m. |
| ASTM 2457/ D523 | GLOSS (placque 1 mm) 45' | % | 77.9 | n.m. | n.m. |
| ISO 180/1A | IZOD 23° C./48 h | KJ/M2 | 2.5 | 2.3 | 2.7 |
| ISO 180/1A | IZOD 0° C./48 h | KJ/M2 | 1.2 | n.m. | n.m. |
| ISO 180/1A | IZOD −20° C./48 h | KJ/M2 | n.m. | n.m. | n.m. |
| ISO 178 | Flexual Modulus/ 48 h | N/MM2 | 1939 | 1965 | 1851 |
| ISO 527 | Tensile Modulus/ 48 h | N/MM2 | 1857 | 1900 | 1883 |
| ISO 527 | Stress at Yield/ 48 h | N/MM2 | 40.3 | 40.2 | 38.8 |
| ISO 527 | Elongation at Yield/48 h | % | 7.9 | 8 | 9.2 |
| ISO 527 | Stress at Break/ 48 h | N/MM2 | 38.5 | 38.8 | 36.4 |
| ISO 527 | Elongation at Break/48 h | % | 14 | 13.5 | 18 |
|  | Mn (GPC) | g/mol | 52425 | 52425 | 51380 |
|  | Mw (GPC) | g/mol | 120263 | 120263 | 127064 |
|  | Mz (GPC) | g/mol | 203176 | 203176 | 239379 |
|  | Mw/Mn |  | 2.3 | 2.3 | 2.5 |
|  | Mw/Mz |  | 3.9 | 3.9 | 4.7 |
|  | IV (GPC) | dl/g | 0.86 | 0.86 | 0.89 |
| ISO 1133 | Melt Flow Rate | g/10 min | 146 | 142 | 140 |
| ISO 3146 | Hc | J/g | −108.6 | n.a.. | n.a.. |
| ISO 3146 | Hm | J/g | 108.4 | n.a. | n.a. |
| ISO 3146 | Tm | ° C. | 158.1 | n.a. | n.a. |
| ISO 3146 | Tc | ° C. | 117.7 | n.a. | n.a. |
|  | Xylene solubles | % | 0.50 | <1 | <1. |
|  | Hexane Extractables, film 100 u | % | <1 | <1 | <1 |

*) the base powder in Example 4 and Example 5 is the same.
n.m.: not measured

Example 4 is prepared without any antistatic agent. Example 5 is prepared with an antistatic agent (Atmer 129). Example 6 shows the effect of an exemplaric blend composition having the final MFR of ca. 140. The final MFR can be calculated by the formula log (MFR final)=X1*log (MFR Blend component 1)+X2*log(MFR Blend component 2)+Xn (log(Blend component N) . . . , whereas X1/X2/Xn represent the percentage of each component.

Comparative Examples 7, 8

For the comparative examples polymer powder obtained according to example 2 was additivated and extruded according the table 5

TABLE 5

| Sample Extruder | Unit | Comparative Example 7 ZE25 | Comparative Example 8 ZE25 |
|---|---|---|---|
| Irganox B215 | ppm | 1500 | 1500 |
| Calcium stearate | ppm | 500 | 500 |
| Millad 3988 | ppm | — | 2000 |
| Atmer 129 | ppm | — | — |
| Polymer powder MFR 60 (Example 2) | % | 99.8 | 99.6 |

The pelletized material was injection moulded (ISO 1873/2). The production of the test specimens required for use related tests and the tests themselves were carried out in accordance with the standards indicated in table 3.

The results are reported in table 6:

TABLE 6

| Method ISO/ ASTM | Variable Name | Units | Comparative Example 7 | Comparative Example 8 |
|---|---|---|---|---|
| ASTM D1003 | HAZE (1 MM) | % | 61.8 | 12.4 |
| ASTM 2457/ D523 | GLOSS (placque 1 mm) (60') | % | 93.2 | 128.8 |
| ASTM 2457/ D523 | GLOSS (placque 1 mm) 45' | % | 57.5 | 80.7 |
| ISO 180/1A | IZOD 23° C./48 h | KJ/M2 | 2.2 | 2.7 |
| ISO 180/1A | IZOD 0° C./48 h | KJ/M2 | n.m. | n.m. |
| ISO 180/1A | IZOD −20° C./48 h | KJ/M2 | n.m. | n.m. |
| ISO 178 | Flexual Modulus/ 48 h | N/MM2 | 1425 | 1685 |
| ISO 527 | Tensile Modulus/ 48 h | N/MM2 | 1415 | 1670 |
| ISO 527 | Stress at Yield/ 48 h | N/MM2 | 34.7 | 37.7 |
| ISO 527 | Elongation at Yield/48 h | % | 9.2 | 8.1 |
| ISO 527 | Stress at Break/ 48 h | N/MM2 | 22.5 | 32.4 |
| ISO 527 | Elongation at Break/48 h | % | 110 | 15 |

TABLE 6-continued

| Method ISO/ASTM | Variable Name | Units | Comparative Example 7 | Comparative Example 8 |
|---|---|---|---|---|
| | Mn (GPC) | g/mol | n.a.. | n.a.. |
| | Mw (GPC) | g/mol | n.a.. | n.a.. |
| | Mz (GPC) | g/mol | n.a.. | n.a.. |
| | Mw/Mn | | 2.5. | 2.5. |
| | Mw/Mz | | n.a. | n.a. |
| ISO 1133 | Melt Flow Rate | g/10 min | 52.7 | 55.4 |
| ISO 3146 | Hc | J/g | −99.8 | −101.8 |
| ISO 3146 | Hm | J/g | 99.3 | 104.8 |
| ISO 3146 | Tm | ° C. | 153.1 | 155.4 |
| ISO 3146 | Tc | ° C. | 105.4 | 120.3 |
| | Xylene solubles | % | 0.9 | 0.8 |
| | Hexane Extractables, film 100 u | % | n.a. | n.a. | n.a. not available

As can be seen the examples 4, 5, 6 have the highest stiffness in combination with low haze values at a MFR significantly higher than 100 g/10' at 230° C./2.16 kg.

The invention claimed is:

1. A polypropylene resin comprising:
   a propylene polymer; and
   0.1 to 1% by weight of a nucleating agent,
   the propylene resin having:
   a melt flow rate (MFR) (ISO 1133) (230° C./2.16 kg) between 120 g/10' and 400 g/10';
   a distribution of molecular weight Mw/Mn lower than 4;
   a haze measured according to ASTM D 1003 (1 mm placque) between 5% and 30%; and
   a flexural modulus measured according ISO 178 after 48 h between 1850 N/mm$^2$ and 2100 N/mm$^2$.

2. A polypropylene resin comprising:
   a propylene polymer;
   0.1 to 1% by weight of a nucleating agent; and
   0.05% to 0.6% by weight of glyceryl monostearate,
   the propylene resin having:
   a melt flow rate (MFR) (ISO 1133) (230° C./2.16 kg) between 120 g/10' and 400 g/10';
   a distribution of molecular weight Mw/Mn lower than 4;
   a haze measured according to ASTM D 1003 (1 mm placque) between 5% and 30%; and
   a flexural modulus measured according ISO 178 after 48 h between 1850 N/mm$^2$ and 2100 N/mm$^2$.

3. The polypropylene resin according to claim 1, wherein the melt flow rate is between 120 g/10' and 200 g/10'.

4. The polypropylene resin according to claim 1, wherein the haze is between 7% and 20%.

5. The polypropylene resin according to claim 1, further comprising:
   a notched IZOD according to ISO (180 1A) at 23° C. after 48 h between 3 kJ/m$^2$ and 1.5 kJ/m$^2$.

6. The polypropylene resin according to claim 1, further comprising:
   hexane extractables of less than 2.6% by weight.

7. The polypropylene resin according to claim 1, further comprising:
   xylene solubles at 25° C. of less than 2% by weight.

8. The polypropylene resin according to claim 1 wherein the propylene polymer of the polypropylene resin comprises isotactic pentads (mmmm) measured by $^{13}$C-NMR higher than 90%.

9. The polypropylene resin according to claim 1 wherein the propylene polymer of the polypropylene resin comprises a content of 2,1-insertions lower than 0.5%, and a content of 1,3 insertions below 0.2%, measured by $^{13}$C-NMR.

10. The polypropylene resin according to claim 1 wherein the propylene polymer of the polypropylene resin is a propylene homopolymer or a propylene copolymer containing from 0.01 to 10% by mol of ethylene or alpha olefins of formula CH$_2$=CHA derived units, wherein A is a C$_2$-C$_{20}$ alkyl radical.

11. A process comprising molding a polypropylene resin to form a molded article by injection molding, the polypropylene resin comprising:
   a propylene polymer; and
   0.1 to 1% by weight of a nucleating agent,
   the propylene resin having:
   a melt flow rate (MFR) (ISO 1133) (230° C./2.16 kg) between 120 g/10' and 400 g/10';
   a distribution of molecular weight Mw/Mn lower than 4;
   a haze measured according to ASTM D 1003 (1 mm placque) between 5% and 30%; and
   a flexural modulus measured according ISO 178 after 48 h between 1850 N/mm$^2$ and 2100 N/mm$^2$.

12. A molded article comprising a polypropylene resin, the polypropylene resin comprising:
   a propylene polymer; and
   0.1 to 1% by weight of a nucleating agent,
   the propylene resin having:
   a melt flow rate (MFR) (ISO 1133) (230° C./2.16 kg) between 120 g/10' and 400 g/10;'
   a distribution of molecular weight Mw/Mn lower than 4;
   a haze measured according to ASTM D 1003 (1 mm placque) between 5% and 30%; and
   a flexural modulus measured according ISO 178 after 48 h between 1850 N/mm$^2$ and 2100 N/mm$^2$.

13. The polypropylene resin of claim 3 wherein the melt flow rate is between 130 g/10' and 200 g/10'.

14. A polypropylene resin comprising:
   a propylene polymer; and
   0.1 to 1% by weight of a nucleating agent,
   the propylene resin having:
   a melt flow rate (MFR) (ISO 1133) (230° C./2.16 kg) between 140 g/10' and 400 g/10';
   a distribution of molecular weight Mw/Mn lower than 4;
   a haze measured according to ASTM D 1003 (1 mm placque) between 5% and 30%; and
   a flexural modulus measured according ISO 178 after 48 h between 1850 N/mm$^2$ and 2100 N/mm$^2$.

* * * * *